(12) United States Patent
Whiteaway et al.

(10) Patent No.: US 6,301,409 B1
(45) Date of Patent: Oct. 9, 2001

(54) OPTICAL COMB FILTER

(75) Inventors: James E Whiteaway; George H Thompson, both of Sawbridgeworth; Terry Bricheno, Gt Sampford, all of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/471,443

(22) Filed: Dec. 23, 1999

(51) Int. Cl.⁷ ....................................................... G02B 6/34
(52) U.S. Cl. ................................ 385/37; 385/31; 385/15; 385/39; 385/27
(58) Field of Search .................................. 385/37, 31, 15, 385/24, 39, 27, 14

(56) References Cited

U.S. PATENT DOCUMENTS

| | | |
|---|---|---|
| 5,629,992 | 5/1997 | Amersfoort et al. |
| 6,111,996 * | 8/2000 | Thompson ............................... 385/24 |

FOREIGN PATENT DOCUMENTS

| | | |
|---|---|---|
| 0254453 | 1/1988 | (EP) . |
| 0591042 | 4/1994 | (EP) . |
| 98/04944 | 2/1998 | (WO) . |

OTHER PUBLICATIONS

C Dragone et al., 'Integrated Optics N×N Multiplexer on Silicon', IEEE Photonics Technology Letters, vol. 3, No. 10, Oct. 1991, pp. 896–899.

\* cited by examiner

Primary Examiner—Rodney Bovernick
Assistant Examiner—Sung Pak
(74) Attorney, Agent, or Firm—Lee, Mann, Smith, McWilliams, Sweeney & Ohlson

(57) ABSTRACT

An optical comb filter is constructed from a monolithic arrangement of two identical integrated optics format arrayed waveguide diffraction gratings connected back-to-back via a star coupler incorporating a field stop (spatial filter0. Alternatively, only one of the diffraction gratings is employed in conjunction with a combined field stop and retro-reflector, the other end of the diffraction grating being optically coupled with one port of an optical circulator.

9 Claims, 9 Drawing Sheets

OPTICAL COMB FILTER

FIELD OF THE INVENTION

This invention relates to optical comb filters, and finds particular, but not necessarily exclusive, application in optical amplifiers for use in wavelength division multiplexed (WDM) bidirectional optical transmission systems employing an interleaved channel assignment in which channels that are adjacent in frequency are employed for signals propagating in opposite directions along a common transmission path between amplifiers.

BACKGROUND TO THE INVENTION

Optical Wavelength Division Multiplexed (WDM) systems ideally require passive optical wavelength multiplexers, demultiplexers, and comb filters, all of which ideally should have isolated pass-bands which are flat-topped so as to allow a measure of tolerance in the spectral positioning of the individual signals of the WDM system within these pass-bands. One method of multiplexing or demultiplexing channels in an optical WDM system relies upon the use of multilayer dielectric interference filters. Another relies upon Bragg reflection effects created in optical fibres. A third method, the method with which the present invention is particularly concerned, relies upon diffraction grating effects.

One optical waveguide format that such a diffraction grating can take for wavelength multiplexing/demultiplexing is the format described in EP 0 254 453, which also refers, with particular reference to its FIG. 5, to the possibility of having a tandem arrangement of two diffraction gratings arranged to provide a combined intensity transfer function that is the product of the intensity transfer function of its component diffraction grating 40 with that of its component diffraction grating 42.

An alternative optical waveguide format that such a diffraction grating can take is an optical waveguide grating that includes a set of optical waveguides in side-by-side array, each extending from one end of the array to the other, and being of uniformly incrementally greater optical path length from the shortest at one side of the array to the longest at the other. Such an optical grating, sometimes known as an arrayed waveguide grating (AWG), constitutes a component of the multiplexer described by C Dragone et al., 'Integrated Optics N×N Multiplexer on Silicon', IEEE Photonics Technology Letters, Vol. 3, No. 10, October 1991, pages 896–9. Referring to accompanying FIG. 1, the basic components of a 4×4 version of such a multiplexer comprise an optical waveguide grating array, indicated generally at 10, whose two ends are optically coupled by radiative stars, indicated schematically at 11 and 12, respectively with input and output sets of waveguides 13 and 14. Monochromatic light launched into one of the waveguides of set 13 spreads out in radiative star 11 to illuminate the input ends of all the waveguides of the grating 10. At the far end of the grating 10 the field components of the emergent light interfere coherently in the far-field to produce a single bright spot at the far side of the radiative star 12. Increasing the wavelength of the light causes a slip in the phase relationship of these field components, with the result that the bright spot traverses the inboard ends of the output set of waveguides 14 as depicted at 15. If the mode size of the waveguides 14 is well matched with the size of the bright spot, then efficient coupling occurs at each of the wavelengths at which the bright spot precisely registers with one of those waveguides 14.

The difference in optical path length between the inboard end of a waveguide 13 and that of a waveguide 14 via adjacent waveguides in the array 10 (the optical path length of a waveguide being the product of its physical length with its effective refractive index) determines the value of the Free Spectral Range (FSR) of the grating for this particular pair of waveguides, being the frequency range over which this difference in optical path length produces a phase difference whose value ranges over $2\pi$ radians. Accordingly the single bright spot is produced in the same position each time the optical frequency is changed by an amount corresponding to a frequency difference that is an integral number of FSRs. It can thus be seen that, for optical transmission from any particular one of the set of waveguides 13 to any particular one of the set of waveguides 14, the device of FIG. 1 operates as a comb filter whose teeth are spaced in frequency by the FSR of its grating 10. The propagation distances across the radiative stars themselves contribute to the FSR of any particular combination of waveguide 13 and waveguide 14, and so not all the FSRs are precisely identical.

Movement of the bright spot across the end of the particular waveguide 14, that occurs in consequence of a change of wavelength, results in an approximately Gaussian transmission pass-band for each tooth of the comb filter (or channel of the multiplexer/demultiplexer). For operation in a practical WDM transmission system, a more nearly flat-topped transmission pass-band is generally a requirement in order to avoid excessive uncertainties in the value of insertion loss that the device is liable to provide as the result of tolerances allowed for in the emission wavelengths of the optical sources employed in that transmission system, and to allow for the modulation bandwidth of the signals transmitted in the individual WDM channels. In this context, it may be noted that the drive to narrower channel spacings will typically aggravate this problem because, in general, the tolerances imposed upon the precision of source wavelengths are not tightened in proportion to the narrowing of the channel spacings, and/or the modulation bandwidth tends to constitute a greater proportion of the channel spacing.

An AWG of this kind can be concatenated with a second AWG by optically coupling one of the output waveguides of the first AWG with one of the input waveguides of the second, an example of such an arrangement being described for instance in EP 0 591 042 with particular reference to its FIG. 3. This tandem arrangement provides a combined intensity transfer function that is the product of the intensity transfer functions of its two component diffraction gratings. The response of this tandem arrangement also provides a typically Gaussian fall off in power that is similarly far from the ideal of a flat-topped response.

A known way of providing a measure of flattening of the transmission pass-band of an AWG that is described in U.S. Pat. No. 5,629,992 involves interposing a length of wider waveguide (not shown in FIG. 1) between the input waveguide 13 and the first star coupler 11. This wider waveguide (also known as a multimode interference (MMI), or mixer, section) is capable of guiding, not only the zero order mode, but also the second order mode, both of which are excited by the launch of zeroth order mode power into it from the waveguide 13 by virtue of the fact that the transition between waveguide 13 and the MMI section is abrupt (non-adiabatic). These two modes propagate with slightly different velocities, and the length of the wider waveguide is chosen to be of a value which causes $\pi$ radians of phase slippage between them. Under these conditions, the field distribution that emerges into the star coupler 11 from the end of the wider waveguide is double peaked. The amount of band-pass flattening thereby occasioned can be expressed in terms of an increase in the value of a figure of merit (FoM) parameter arbitrarily defined as the ratio of the −0.5 dB pass-band width to the −30.0 dB pass-band width. A significant drawback of the mixer section approach to pass-band flattening is that the insertion loss is intrinsically increased consequent upon the mismatch between the size of the flattened field distribution that is incident upon the inboard end of the output waveguide 14 and that of the field distribution of the zero order mode that is guided by that waveguide 14. By way of example, a mixer section supporting the zero and second order modes can be employed to increase the FoM of an AWG from about 0.14 to about 0.30, but this improvement in FoM is achieved at the expense of increasing the insertion loss of the device by approximately 2 dB. Further flattening can be obtained by widening still further the width of the mixer section to enable it to guide a larger number of even order modes, but this introduces yet higher increases in insertion loss. For instance, if the FoM is increased in this way to about 0.45, this is achieved at the expense of an excess insertion loss of approximately 4dB. Additionally, it can be shown that the widening to support the simultaneous guidance and propagation of three or more modes is liable to introduce dispersion problems unless the MMI section could be somehow specially configured to provide the guided modes with a substantially even spacing of propagation constants ($\beta$) instead of the uneven spacing typical of most waveguide configurations.

A construction of multiplexer/demultiplexer that also uses a tandem arrangement of optical waveguide gratings, but which is capable of achieving a response that is nearly flat-topped without introducing an excessive insertion loss is described in the specification of WO 98/04944, to which specification attention is specifically directed and its teaching incorporated herein by reference. For the multiplexer/demultiplexer of WO 98/04944 to operate properly as a multiplexer/demultiplexer, it is necessary for the two AWGs of the tandem arrangement to have different values of FSR. Specifically, the FSR of one AWG needs to be made equal to the optical frequency spacing of the channels being multiplexed/demultiplexed, while the FSR of the other AWG needs to be made at least as large as the product of this frequency difference with the number, N, of the channels that the device is designed to multiplex/demultiplex. The FSRs of the two AWGs of the WO 98/04944 multiplexer/demultiplexer must therefore differ by a factor of at least two.

SUMMARY OF THE INVENTION

An object of the present invention is to provide a relatively low loss, and low dispersion, form of AWG-based optical comb filter with a relatively flat-topped pass-band (relatively high FoM) in respect of each tooth thereof.

According to a first aspect of the present invention, there is provided an optical comb filter having a set of pass-band 'teeth' regularly spaced in optical frequency, which teeth are separated by intervening stop-bands, which comb filter has an optical input port optically coupled with an optical output port via a tandem arrangement of first and second optical waveguide diffraction gratings that provide multiple optical waveguide paths from said input port to said output port via different grating elements of the gratings;

wherein the difference in optical path length occasioned by paths via each pair of adjacent grating elements of either grating has substantially the same value, said difference value defining said gratings with substantially the same value of Free Spectral Range, being the frequency range over which said optical path length difference produces a phase difference whose value ranges over $2\pi$ radians; and wherein the portion of the optical coupling between the input and output ports that extends between the first and second diffraction gratings couples spatial information between the two gratings in addition to intensity information, and includes a field stop that limits the frequency range of the coupling, and hence the pass-band of each tooth of the comb filter, to a value less than the Free Spectral Range of the diffraction gratings.

It may be noted that, whereas the comb filter of the preceding paragraph has a number of features in common with the multiplexer/demultiplexer of WO 98/04944, and indeed that the multiplexer/demultiplexer of WO 98/04944 is capable of being operated as a comb filter through the expedient of utilising only one of its input ports and only one of its output ports; nevertheless the comb filter of the preceding paragraph and the multiplexer/demultiplexer of WO 98/04944 are quite distinct devices, not least because the former employs two gratings required to have substantially identical FSRs, while the latter employs two gratings required to have FSRs whose magnitudes differ by a factor of at least two.

According to a second aspect of the present invention, there is provided an optical comb filter having a set of pass-band 'teeth' regularly spaced in optical frequency, which teeth are separated by intervening stop-bands, which comb filter has an optical input/output port optically coupled with itself via an optical waveguide diffraction grating and a retro-reflector that causes light incident upon the retro-reflector from the input/output port via the grating to make a return passage through the grating back to the input/output port;

wherein the grating provides multiple optical waveguide paths from said input/output port to said retro-reflector via different grating elements of the gratings;

wherein the difference in optical path length occasioned by paths via each pair of adjacent grating elements of the grating has substantially the same value, said difference value defining the Free Spectral Range of the grating, being the frequency range over which said optical path length difference produces a phase difference whose value ranges over $2\pi$; and wherein the retro-reflector couples spatial information back into the grating in addition to intensity information, and includes a field stop that limits the frequency range of the coupling, and hence the pass-band of each tooth of the comb filter to a value less than the Free Spectral Range of the diffraction grating.

Other features and advantages of the invention will be readily apparent from the following description of preferred embodiments of the invention, from the drawings and from the claims.

DETAILED DESCRIPTION OF PREFERRED EMBODIMENTS

Figure 1:
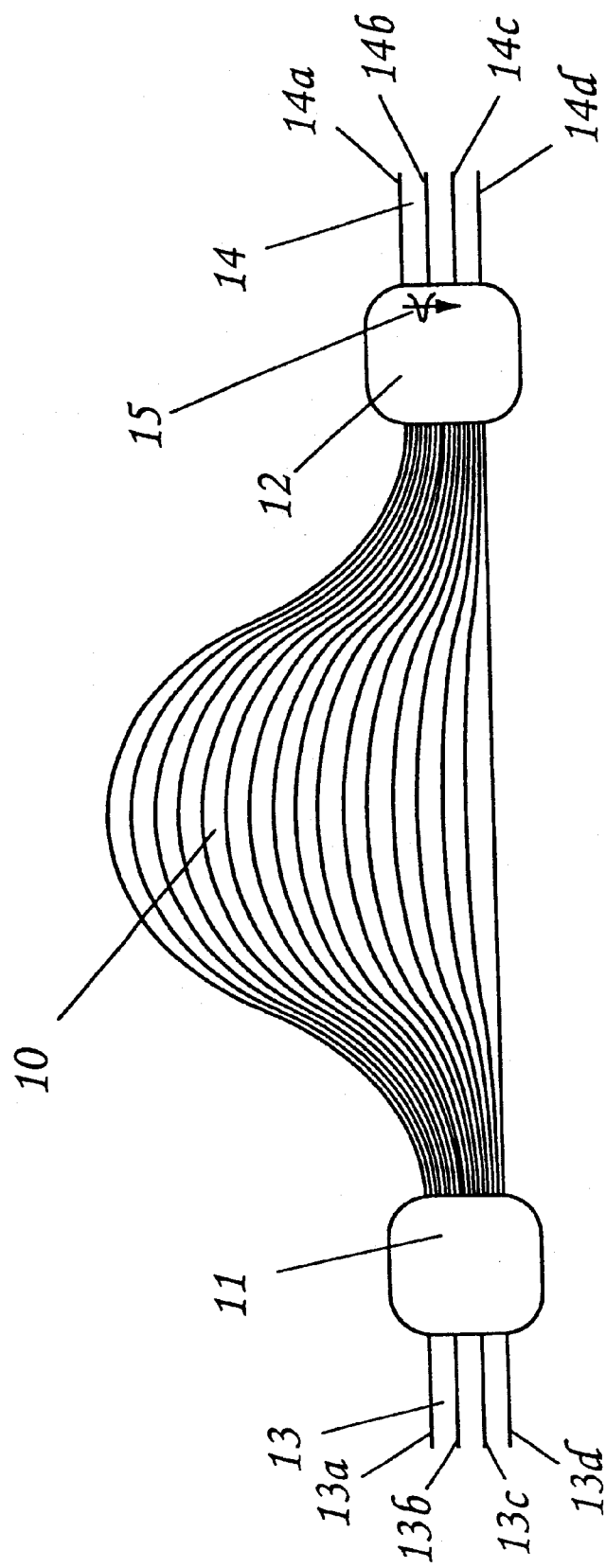
FIG. 1 (to which previous reference has already been made) schematically depicts a prior art optical multiplexer/demultiplexer employing an optical waveguide type diffraction grating.
Figure 2:
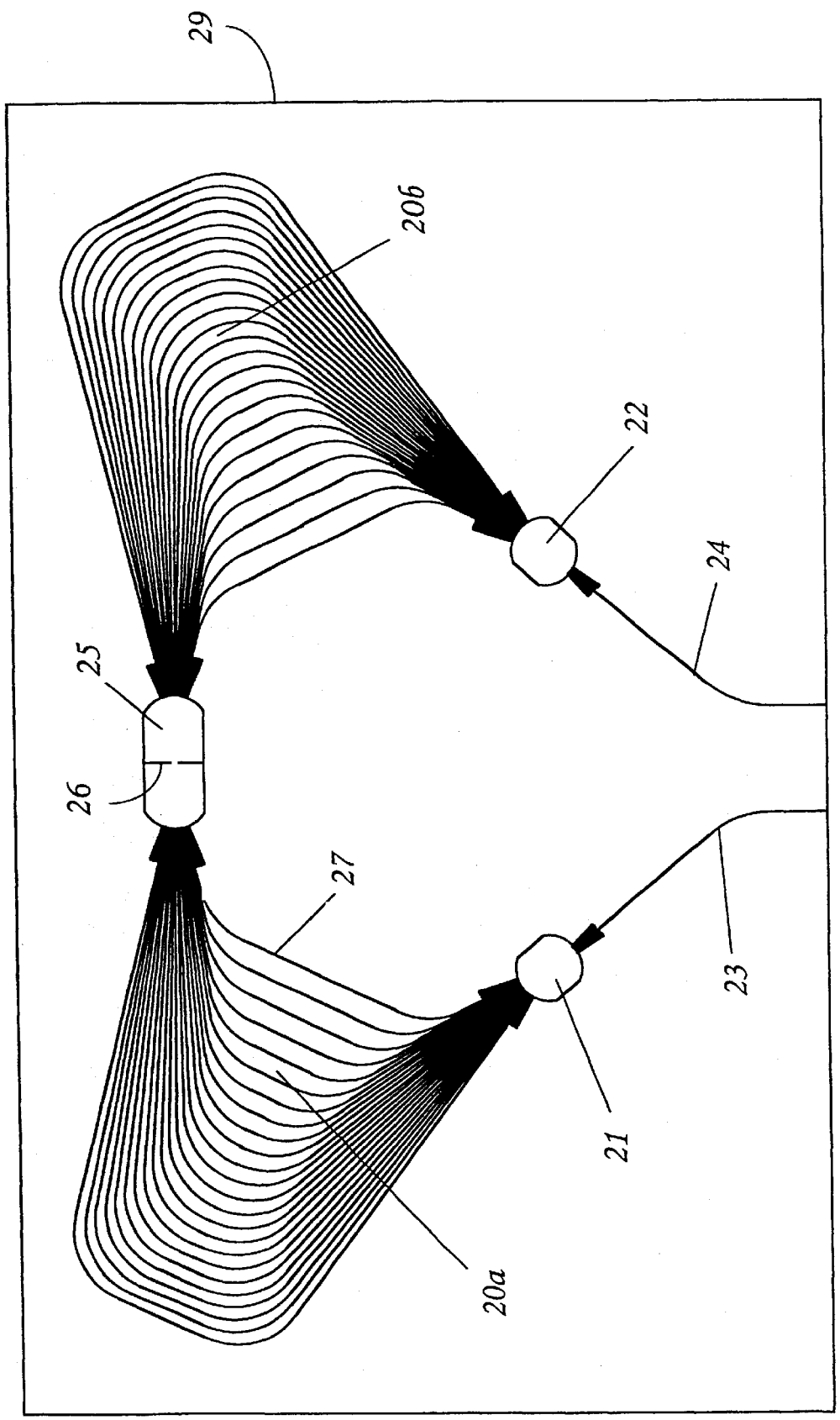
FIG. 2 is a schematic diagram of an optical waveguide type diffraction grating comb filter embodying the invention in a preferred form.

In FIG. 2 there is schematically depicted a comb filter embodying the invention in a preferred form. It comprises, formed on a wafer 29, first and second identical optical waveguide gratings indicated generally at 20a and 20b, respectively coupled by radiative star couplers 21 and 22 with input and output waveguides 23 and 24. The other ends of the gratings 20a and 20b are coupled by a further radiative star coupler 25 that includes a field stop (spatial filter) 26. This field stop can, at least in principle, be constituted in the form of an opaque diaphragm composed of two separated parts defining an aperture between the nearer edges of those two parts.

Figure 3:
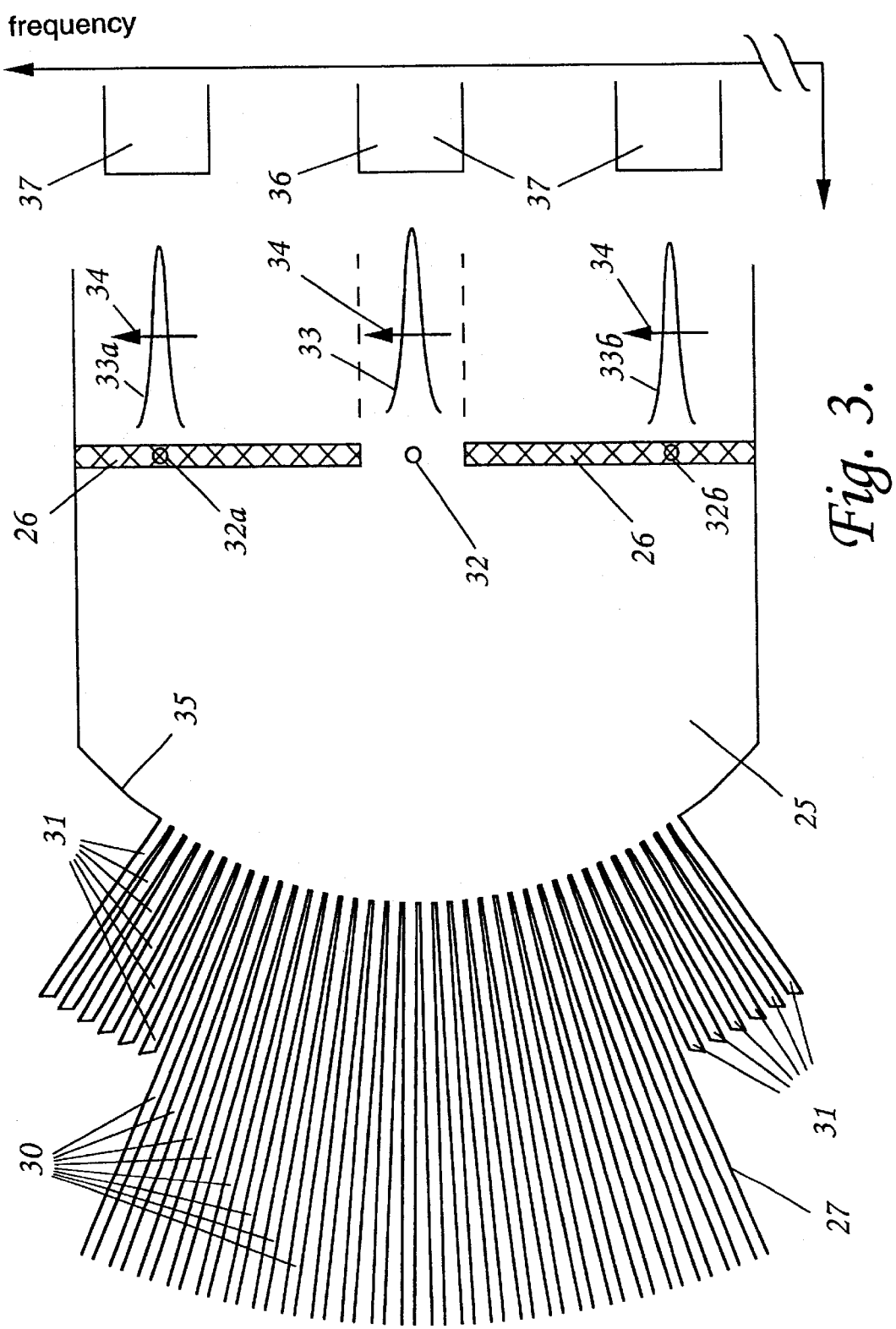
FIG. 3 is a schematic diagram depicting in more detail, and on a larger scale, a portion of the comb filter of FIG. 2, FIGS. 4, 5 and 6 are schematic diagrams of successive stages in the construction of an integrated waveguide optical device in which a multiplexer/demultiplexer embodying the invention in a preferred form is formed.

Each of the gratings 20a and 20b is configured as a set of optical waveguides extending in side-by-side relationship in a set of arcuate paths. FIG. 3 schematically depicts on a larger scale, and in greater detail, the part of the grating 20a where it terminates in radiative star coupler 25. In FIG. 3 the individual waveguides of the grating are indicated at 30. They terminate at a part 35 of the boundary of the radiative star coupler 25 that has the form of an arc of a circle centred in the central aperture of the field stop 26. The end sections of the waveguides 30 are disposed radially so that their axes intersect at the centre of curvature of the circular arc 35. Optionally, the set of waveguides 30 is flanked by two sets of dummy waveguides 31 that are also disposed radially, but are terminated obliquely after a short distance. The function of these dummy waveguides 31 is to place the ends of those of the waveguides 30 that are near the side edges of the array in a lateral environment more nearly resembling that of the waveguides 30 further away from those side edges.

The waveguide at one side edge 27 of the grating 20a is the shortest one of the array, and each of the others is longer than one of its immediate neighbours by the same incremental length, $\Delta s$, that defines the FSR (free spectral range) of the array. If nearly monochromatic light disposed about a centre optical frequency, $f_m$, that satisfies the condition that the length increment $\Delta s$ introduces a phase difference of $2m\pi$, is launched into the input waveguide 23, then the grating will form an $m^{th}$ diffracted order spot of light 32 at the centre of the aperture in the field stop 26. Ignoring the effects of any imperfections in the grating 20a, the size of the spot of light 32 is determined in part by the V-value of the waveguides, in part by the geometry, and in part by the spectral spread of the launched light. Its intensity distribution is represented by trace 33. The grating will also form slightly reduced intensity $(m-1)^{th}$ and $(m+1)^{th}$ diffracted order spots of light 32a and 32b (also of centre optical frequency $f_m$), with their corresponding intensity traces 33a and 33b. The effect of increasing the centre frequency of the light launched into waveguide 23 above the value $f_m$, is to cause the spots of light 32, 32a and 32b to move in the direction of arrows 34. If the central aperture defined by the field stop 26 had been as wide as the separation between adjacent spots of light 32 and 32a, then the field stop would have exercised no spectral filtering effect because, when the frequency is increased to the extent that spot of light 32 begins to get intercepted by the upper half of the field stop 26, spot of light 32b is simultaneously beginning to cease being intercepted by the lower half. In fact, however, the central aperture of the field stop 26 is narrower than this, and so the aperture defines the spectral window indicated at 36.

The effect of increasing the centre frequency of the light launched into waveguide 23 to $f_{(m+1)}$, where the value of $f_{(m+1)}$ exceeds that of $f_m$ by one FSR, is to move the $(m+1)^{th}$ diffracted order spot of light 32b (now of centre optical frequency $f_{(m+1)}$ to the position formerly occupied by the spot of light 32 when the light was of centre optical frequency $f_m$. Generalising from this, it may be seen that the spot of light 32 of diffraction order m and centre frequency $f_m$ is coincident with the spots of light of diffraction order (m+n) and centre frequency $f_{(m+n)}$ (where n is a positive or negative integer), while the spot of light 32a of diffraction order (m−1) and centre frequency $f_m$ is virtually coincident with the spots of light of diffraction order (m+n−1) and centre frequency $f_{(m+n)}$, and the spot of light 32b of diffraction order (m+1) and centre frequency $f_m$ is virtually coincident with the spots of light of diffraction order (m+n+1) and centre frequency $f_{(m+n)}$. This means that the spectral window 36 defined by the central aperture of the field stop 26 is just one member of a large set of spectral windows 37 with a frequency spacing of one FSR.

Having regard to the fact that the width of the aperture of the field stop 26 defines the spectral extent (frequency acceptance range) of the spectral windows 37, it is clear that, because these windows are on a frequency pitch of one FSR, the spectral extent of each of these windows must itself be less than one FSR, or else the field stop exercises no spectral filtering effect.

To understand the operation of grating 20b and its star coupler 22 upon the light that passes through the aperture of field stop 26, it is convenient first to note that neither the grating nor the star coupler contains any non-reciprocal element, and then to consider what happens to the light if, instead of being launched into input port 23, it were to be launched into output port 24. The comb filter exhibits mirror symmetry about the field stop 26, and so the light penetrating the aperture in field stop 26 in the right-to-left direction from a launch into output port 24 is the mirror image of that penetrating in the left-to-right direction from a launch into input port 23. In view of the absence of any non-reciprocal elements, it is therefore clear that the light penetrating the aperture in the field stop 26 in the left-to-right direction from a launch into the input port 23 is received by the grating 20b to be directed by its star coupler 22 to emerge from the comb filter by way of its output port 24.

For operation in a WDM environment in which the individual signal channels are substantially aligned with the frequencies of a regular (ITU) frequency grid with a spacing of $\Delta f$ between adjacent members of that grid, and in which the comb filter is designed for transmitting every $r^{th}$ channel, the FSR of the gratings of the comb filter is made equal to $(r \times \Delta f)$, while the central aperture in the field stop 26 is made to define a frequency acceptance range somewhat smaller than $\Delta f$. The frequency acceptance range is required to be less than $\Delta f$ by an amount that will ensure that signals in the unselected channel are sufficiently occluded by the field stop, but not so much smaller as to impose too tight a tolerance upon the requirements of accuracy of alignment of the individual signals with their corresponding grid frequencies.

Figure 4:
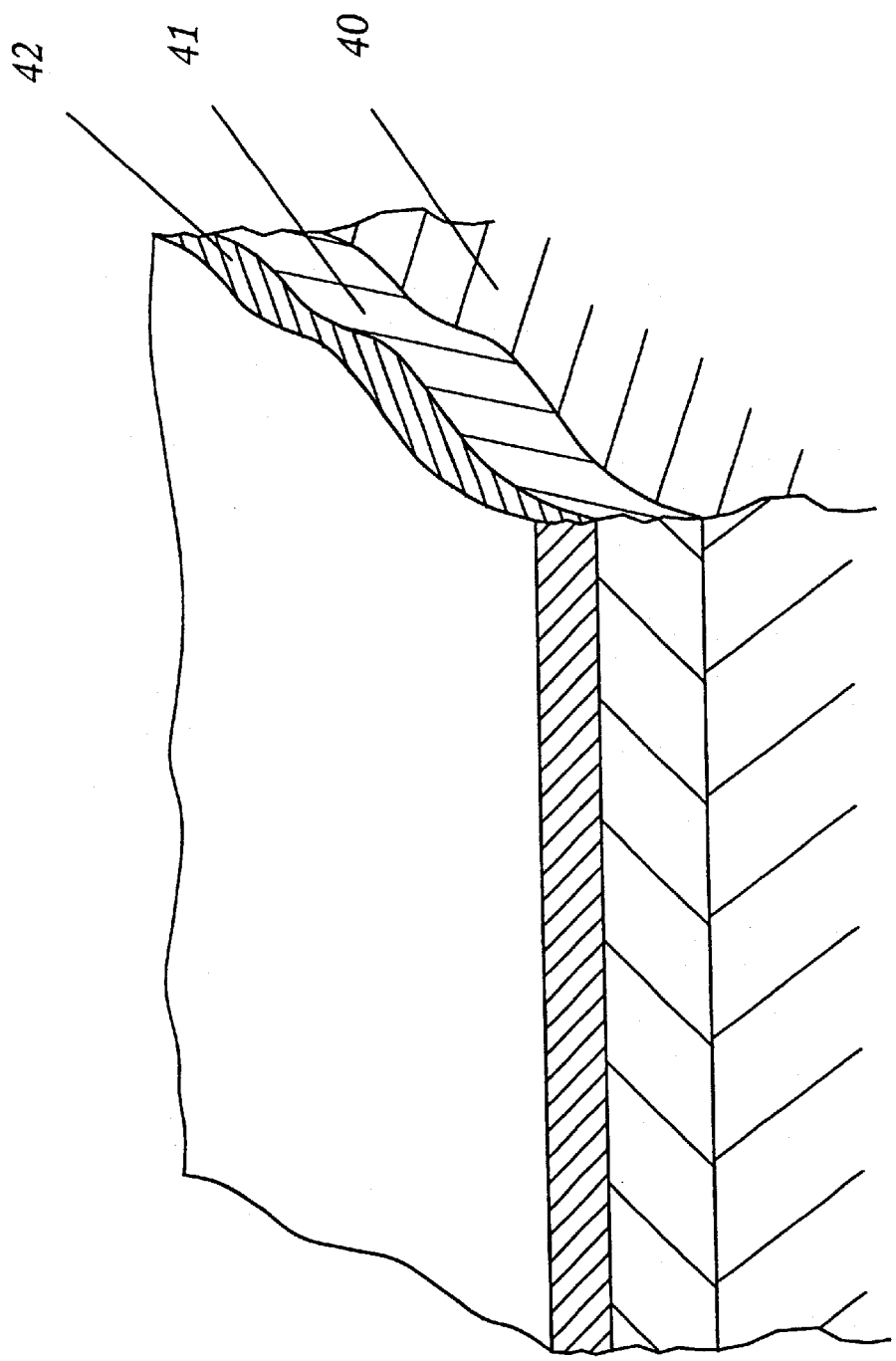
Figure 5:
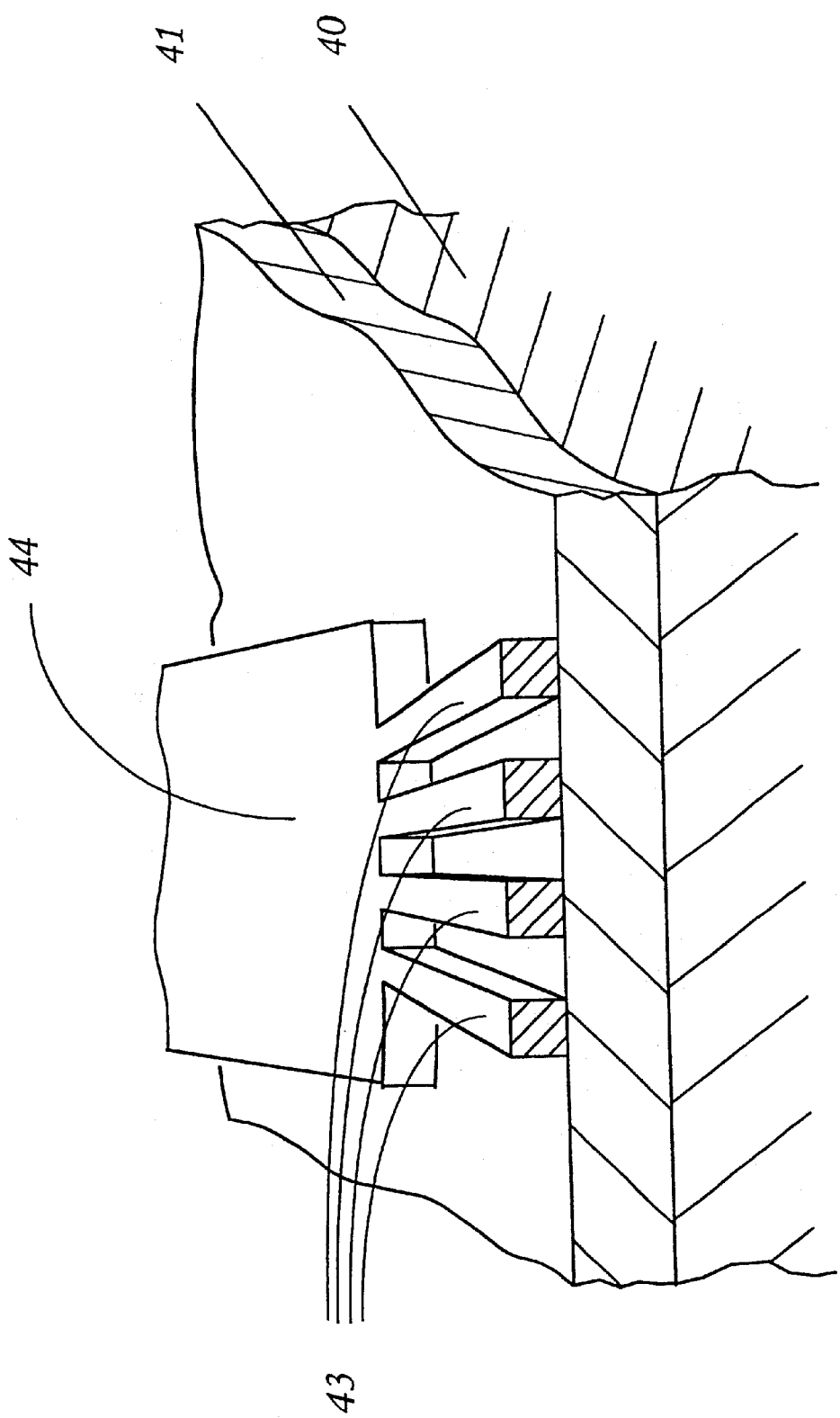
Figure 6:
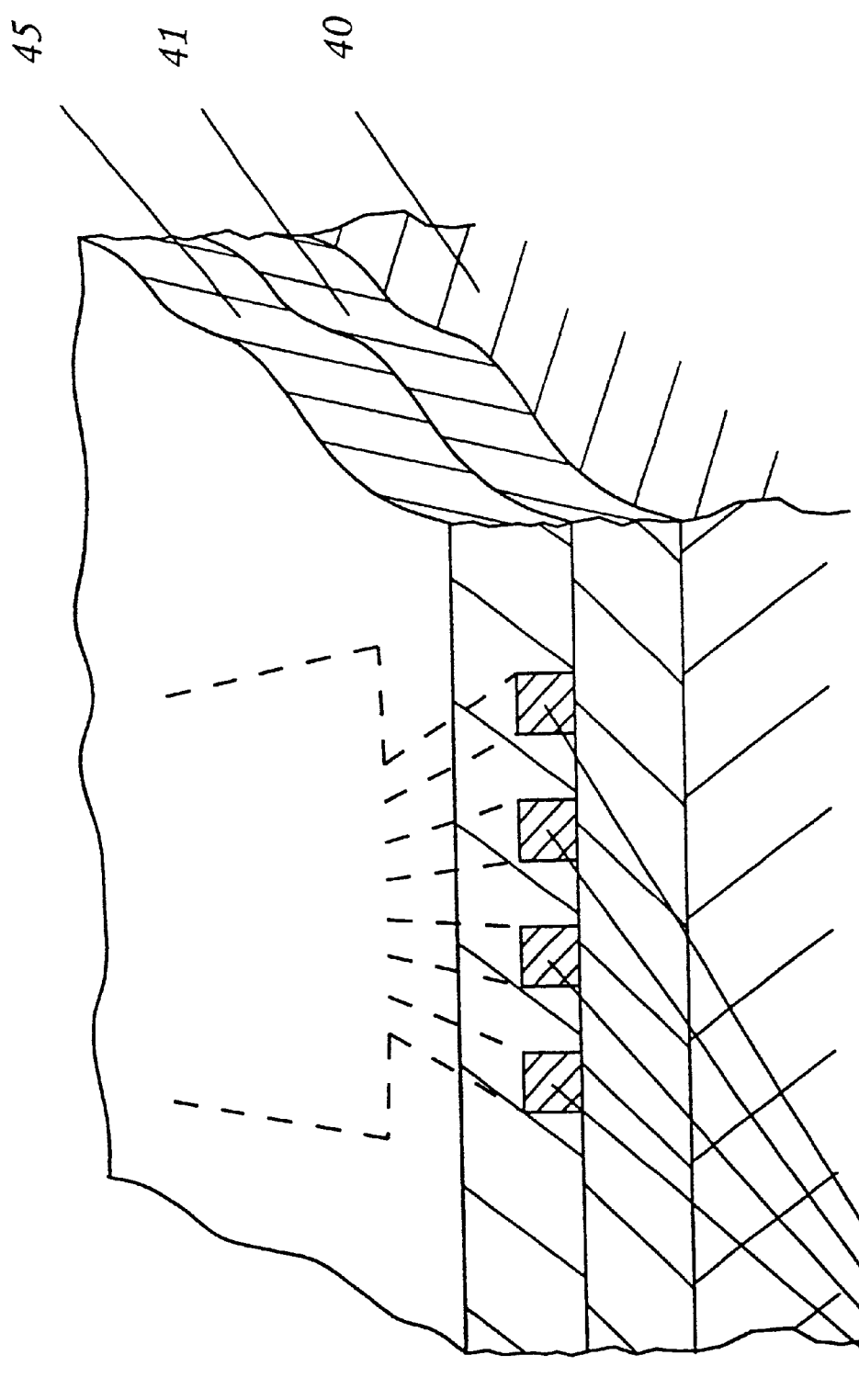

The method of constructing the comb filter of FIGS. 2 and 3 uses a known form of processing to create the required configuration of optical waveguides in an integrated waveguide optics structure. Successive stages of this processing are schematically illustrated in FIGS. 4, 5 and 6. Referring in the first instance to FIG. 4, a layer 41 (a buffer layer) of cladding glass, typically a layer of silica, is deposited upon a planar substrate 40, typically a silicon substrate. On layer 41 is deposited a layer 42 of core glass having a refractive index a controlled amount greater than that of the cladding glass layer upon which it is deposited. Typically the core glass layer 42 is composed of doped silica. Standard photolithographic techniques are then used to pattern this layer to define the required configuration of waveguides. The portion of integrated waveguide optics structure illustrated in FIGS. 4, 5 and 6 includes portions of a number of optical waveguides 43 in each of which a waveguiding effect is provided both in the direction normal to the plane of the layer 42 and in the direction lying in the plane of that layer that is at righ-tangles to the axial direction of that waveguide. For convenience of illustration, only four of those waveguides 43 have been specifically illustrated in FIGS. 5 and 6, though it is to be understood that in practice a grating may typically actually have between 20 and 50 of such waveguides. These four waveguides 43 are shown terminating in a planar waveguide region 44, part of one of the star couplers 21, 22 or 25, in which there is still a waveguiding effect in the direction normal to the plane of layer 42, but in which light is able to radiate laterally from any one of the waveguides 43. After completion of the patterning of layer 42, it is covered with a further layer 45 of cladding glass whose refractive index is less than that of core glass layer 42, preferably having an index matched with that of cladding glass layer 41. Typically this cladding glass layer 45 is also made of doped silica, the doping in this instance not being chosen to raise the refractive index of the host material, but to lower its flow temperature.

Figure 7:
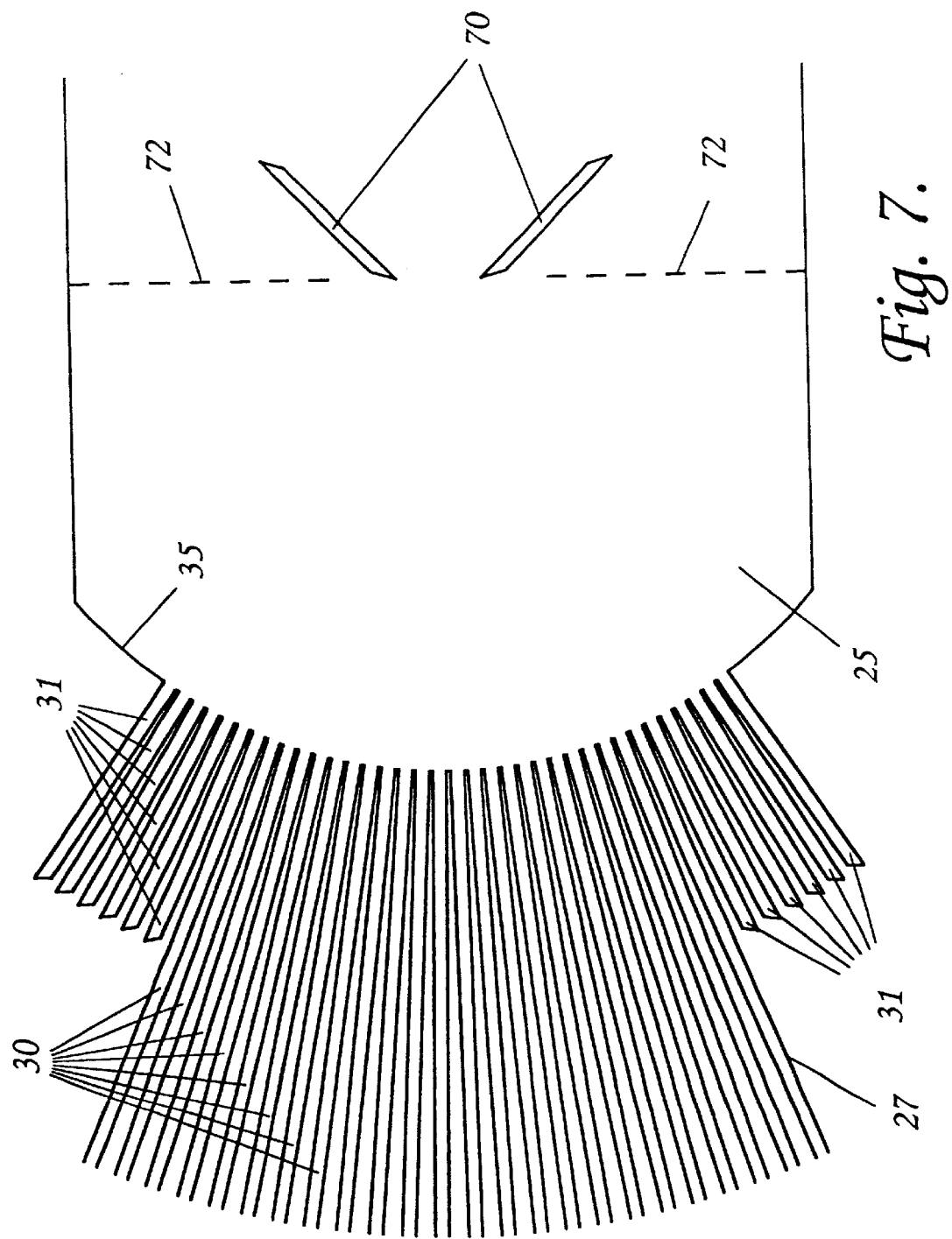
FIG. 7 is a schematic diagram corresponding to that of FIG. 3, but illustrating a preferred format of field stop.

It was earlier stated that the field stop 26 can, at least in principle, be constituted in the form of an opaque diaphragm composed of two separated parts defining an aperture between the nearer edges of those two parts, and this is the way it has been so represented in FIGS. 2 and 3. In practice, this is a form that is difficult to implement in an integrated waveguide format star coupler. A form that is easier to implement, and which is the preferred form for the comb filter of FIG. 2, is depicted in FIG. 7. This form of field stop comprises a pair of troughs 70 arranged in the pattern of an open chevron, and etched deep into the integrated waveguide optics structure of the star coupler 25 so as to penetrate right through its upper cladding glass and core glass layers 45 and 42, and well into, if not completely through, the lower cladding glass layer 41. Each of these troughs 70 has a long side-wall facet 71 that obliquely faces the grating 20a and is oriented at a sufficient angle thereto for specular reflection in that facet to be total internal reflection at that facet. The inner ends of the facets 71 lie in the symmetry plane 72 of the star coupler 25 (i.e. the image plane of the gratings 20a and 20b). At their inner ends, the facets 71 define between them the desired aperture width. At their outer ends, they are only slightly less than three times as far apart so as to be somewhat further apart than the total spread of the waveguides 30 of grating 20a at its abutment with the star coupler 25. These linear and angular dimensions are also chosen to ensure that, neither by single nor multiple specular reflection in these facets, is light able to couple from the waveguides of grating 20a into those of grating 20b, or back again into the waveguides of grating 20a.

Each of the two gratings 20a and 20b of a comb filter of the type of. configuration illustrated in FIGS. 2 to 6 of this specification, and designed to pass only alternate channels in a WDM environment with a 50 GHz channel spacing (i.e. a comb filter whose gratings both have FSRs of 100 GHz), may typically occupy a silica-on-silicon wafer area of about 25 mm by 30 mm. For satisfactory operation, the two optical waveguide diffraction gratings 20a and 20b typically need to register to at least one tenth, and preferably to one fifteenth of a channel separation, or better; i.e. a tolerance of about ±0.025 nm or better is called for. One of the limiting factors in achieving such tight tolerances is control over the thickness and composition of the layers 41, 42 and 45 of wafer 29 that go to make up its optical waveguiding structure. Inspection of FIG. 6 of this specification reveals that in the case of a compositional or thickness gradient with a component extending in the left-to-right direction (direction of the side edge of wafer 29 that contains the input and output ports 23 and 24), that component is likely to be more troublesome than a component of equal magnitude extending in the orthogonal direction. This is because, in the case of the component of the gradient extending in the up-and-down direction, the effects it produces in diffraction grating 20a are at least partially offset by those it produces in diffraction grating 20b. Using current wafer processing technology it has been found that these tolerance requirements impose at least somewhat of a yield problem so far as the provision of suitable wafers is concerned, and that this yield problem is liable to be significantly greater when attempting the construction of comb filter devices for operation in a WDM environment with a closer channel spacing.

Figure 8:
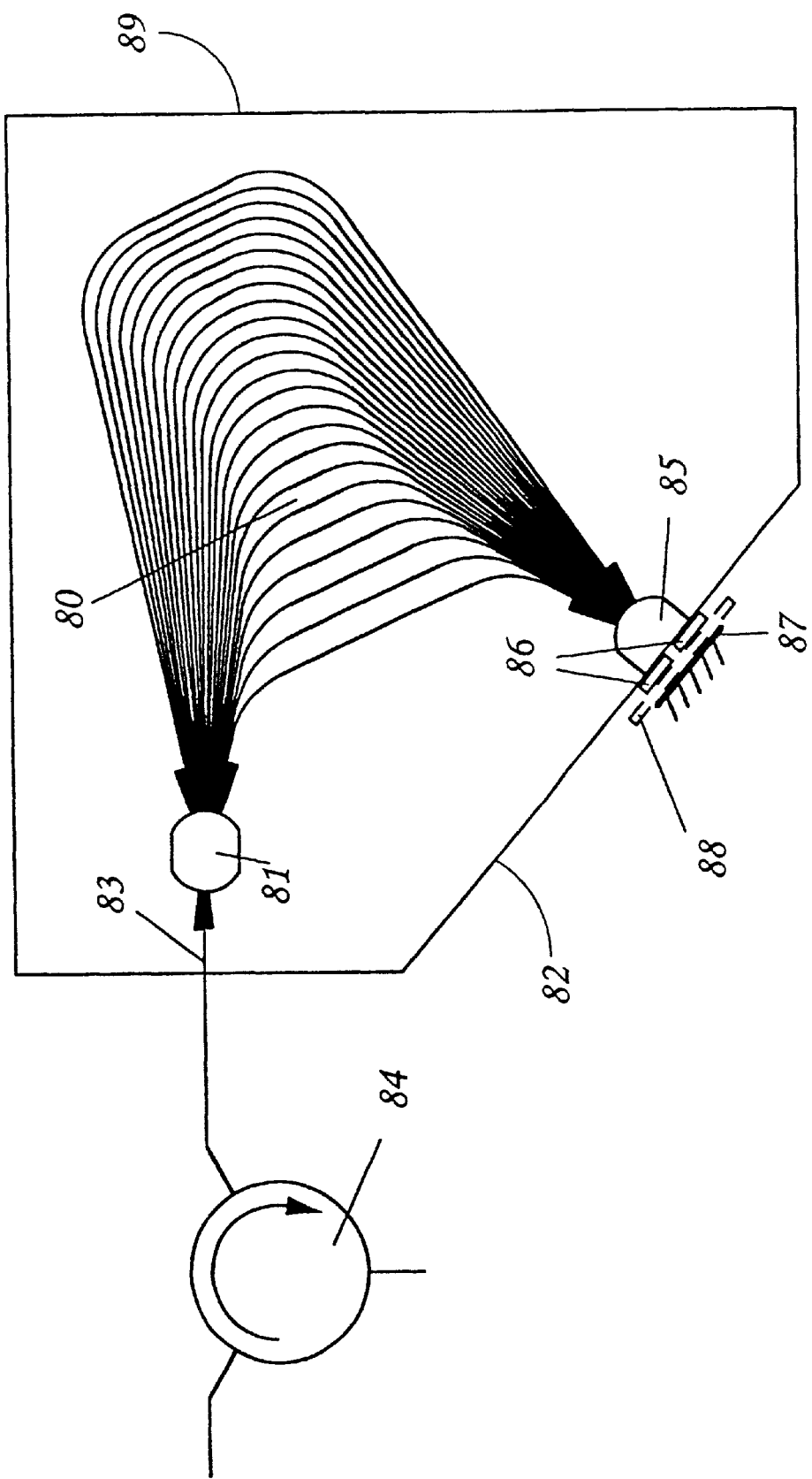
FIG. 8 is a schematic diagram of an optical waveguide type diffraction grating comb filter embodying the invention in an alternative preferred form.

A comb filter design that is more tolerant of these thickness and compositional gradients is schematically depicted in FIG. 8. In essence, the comb filter of FIG. 8 is derived from that of FIG. 2 by placing a retro-reflector at the plane of symmetry of the FIG. 2 comb filter so as to form a reflex configuration that dispenses with the grating 20b, the star coupler 22 and the output port 24. The original input port 23 now functions as a two-way traffic port. To provide separated input and output ports for the comb filter, this two-way port may be connected to one port of a circulator. Accordingly, the comb filter of FIG. 8 has, formed on a wafer 89, an optical waveguide grating indicated generally at 80 (corresponding to optical waveguide grating 20a of FIG. 2) coupled by a radiative star coupler 81 (corresponding to radiative star coupler 21 of FIG. 2) with a waveguide 83 (corresponding to waveguide 23 of FIG. 2). The other end of the grating 80 is coupled by a further radiative star coupler 85 with a combined retro-reflector 87 and field stop (spatial filter) 86. This combined reflector and field stop can, at least in principle, be constituted in the form of a narrow stripe reflector (not shown) having dimensions matched with the aperture in the field stop 26 of the comb filter of FIG. 2. Provided that reflectivity beyond the bounds of such a narrow stripe reflector can be adequately suppressed, such an arrangement has the potential advantage of affording the possibility of angular and translational positional adjustment of the narrow stripe reflector relative to the wafer 89 to adjust the spectral positioning of the filter pass-band. In other circumstances, it may be found more convenient, particularly because of the positional precision required, to employ a field stop in the form of an opaque diaphragm composed of two separated parts defining an aperture between the nearer edges of those two parts, and to place a larger area reflector as close as is conveniently possible behind this field stop. The combined reflector and field stop is located as close as possible to the point in the star coupler 85 at which the ends of the waveguides of the grating 80 are pointing. The waveguide 83 is coupled with one port of a 3-port circulator 84.

Optionally a quarter-waveplate 88 may be included between the field stop 86 and the reflector 87, its orientation being chosen so that the component of light emerging from the wafer 89 through the field stop 86 that is plane polarised in the plane of the wafer is launched back into the wafer, after reflection in reflector 87, plane polarised normal to the plane of the wafer. Under these conditions, any polarisation effects suffered by light in its propagation in the wafer 89 from the circulator 84 to the reflector 87, are compensated by the return passage of the light from the reflector 87 back to the circulator 84. (When using the narrow stripe reflector format of combined reflector and field stop, the quarter-waveplate would be included between this narrow stripe reflector and the wafer.)

Figure 9:
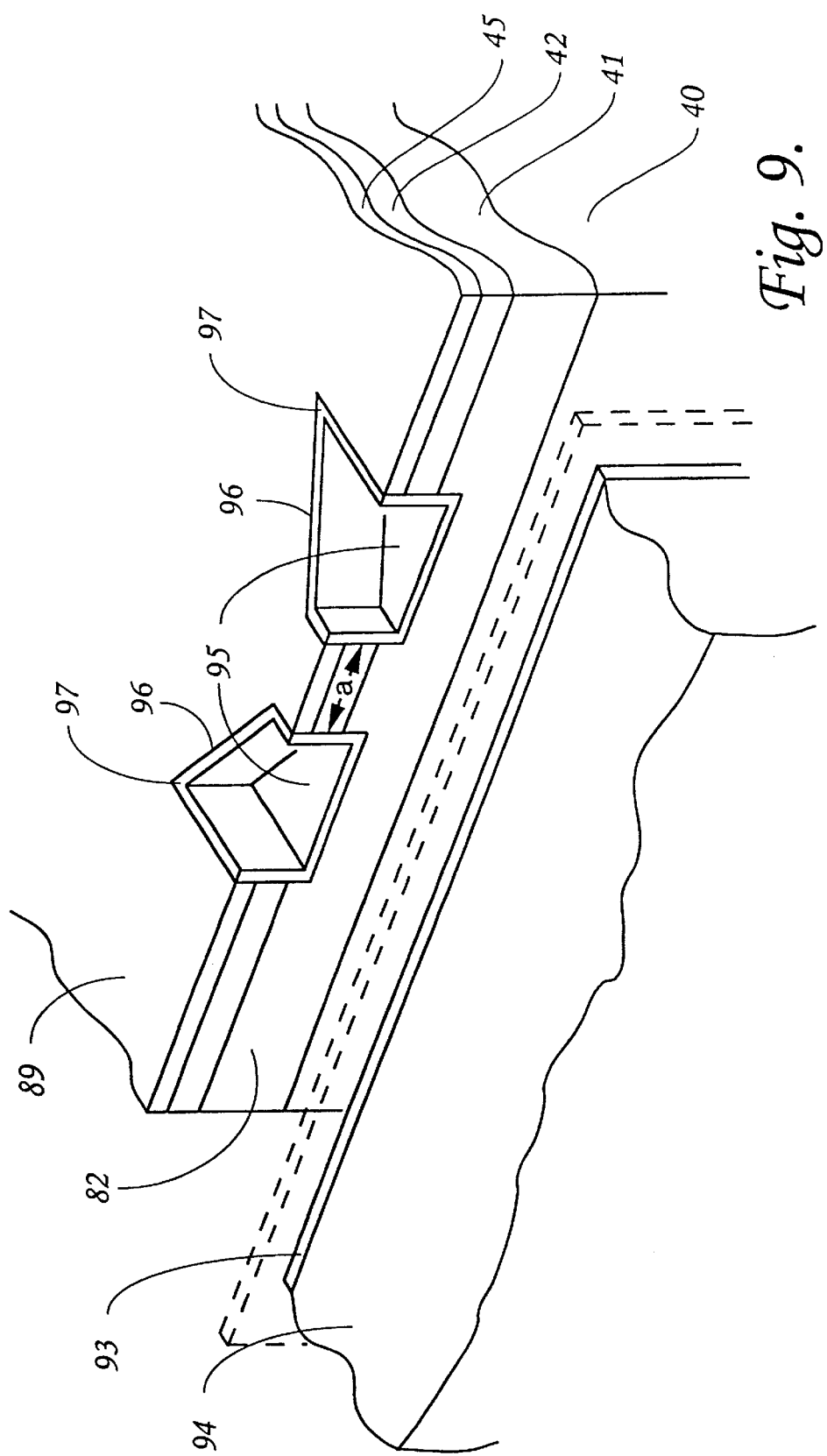
FIG. 9 is a schematic diagram depicting in more detail, and on a larger scale, a portion of the comb filter of FIG. 8.

For convenience of illustration, the field stop 86 of FIG. 8 has been represented in the form of an opaque diaphragm composed of two separated parts defining an aperture between the nearer edges of those two parts. In practice, this is a form that is difficult to implement with sufficient positional precision in relation to the wafer 89. A form that is easier to implement, and which is the preferred form for the comb filter of FIG. 8, is depicted in FIG. 9 which depicts a schematic perspective view of a portion of the comb filter of FIG. 8 where the star coupler 85 meets the side edge 82 of wafer 89.

The field stop reflector combination should provide, over a specific region of width 'a', high quality specular reflection to reverse the direction of propagation of the light incident from waveguides 30 of grating 80. Beyond the confines of the region of width 'a', the incident light should either be absorbed, or reflected in such directions that this reflected light is not coupled back into any of those waveguides 30.

Instead of attempting to provide a high quality specularly reflecting surface at face 82 itself, it is preferred for this reflecting surface to be provided by a reflector (87 in FIG. 8) constituted by metallisation 93 deposited upon a cleaved or polished surface of a crystal chip 94 which is subsequently cemented with an index-matching adhesive (not shown) to face 82. By this means, a face 82 prepared by sawing the wafer can be of acceptable quality.

To provide the requisite field stop, two wells 95 are etched through cladding-and core-glass layers 45 and 42, and into buffer layer 41 before the wafer is sawn to produce the face 82. These wells have side-walls 96 that are aligned at a sufficiently large angle with respect to face 82 for any light specularly reflected by these side-walls to be deviated enough to fail to couple into any of the optical waveguides 30 of grating 80. If required, a light-absorbing, or light-reflecting, coating 97 is applied to the interiors of the wells 95 so that the side-walls 96 cannot be contacted by the index-matching adhesive subsequently used to secure chip 94 in position on face 82. As mentioned previously, the reflector (87 in FIG. 8) that is constituted by metallisation 93 is optionally faced with an appropriately oriented quarter-waveplate 88.

In the foregoing specific description reference has been made to the FSRs of the optical waveguide gratings 20a, 20b and 80, and it has been explained that the FSR of such a grating is determined by the difference in optical path lengh between adjacent waveguides 30 that go to make up that grating. It has additionally been explained that the optical path length of a waveguide is the product of its physical length with its effective refractive index. It is also known that, in general, different modes propagate with different velocities, and hence have different refractive indices. Accordingly assigning a single value to the FSR of an optical waveguide grating implies that a single mode is propagating in each of its waveguides 30. However this does not necessarily imply that those waveguides are specifically dimensioned so that all modes but the zeroth order modes are cut-off; it is sufficient that the waveguides are 'effectively' single mode, being dimensioned such that, if they do guide one or more higher order modes, then they are constructed so that those higher order modes are much more heavily attenuated than the zeroth order mode because the end-to-end propagation of higher order mode power in such a waveguide is generally found to be detrimental to device operation. Nor are these waveguides necessarily of the same cross-section throughout their end-to-end length, but may, for instance, incorporate one or more adiabatic tapers.

What is claimed is:

1. An optical comb filter having a set of pass-band teeth regularly spaced in optical frequency, which teeth are separated by intervening stop-bands, which comb filter has an optical input port optically coupled with an optical output port via a tandem arrangement of first and second optical waveguide diffraction gratings that provide multiple optical waveguide paths from said input port to said output port via different grating elements of the gratings;

wherein the difference in optical path length occasioned by paths via each pair of adjacent grating elements of either grating has substantially the same value, said difference value defining said gratings with substantially the same value of Free Spectral Range, being the frequency range over which said optical path length difference produces a phase difference whose value ranges over $2\pi$ radians; and wherein the portion of the optical coupling between the input and output ports that extends between the first and second diffraction gratings couples spatial information between the two gratings in addition to intensity information, and includes a field stop that limits the frequency range of the coupling, and hence the pass-band of each tooth of the comb filter, to a value less than the Free Spectral Range of the diffraction gratings.

2. A comb filter as claimed in claim 1, wherein the field stop limits the frequency range of the coupling to a value less than one half of the Free Spectral Range of the diffraction gratings.

3. A comb filter as claimed in claim 2, wherein the first and second diffraction gratings, and the optical coupling that extends between them, are constructed in integrated waveguide optics structure format with each diffraction grating configured as a set of optical waveguides extending in side-by-side relationship in a set of arcuate paths.

4. A comb filter as claimed in claim 3, wherein the field stop is constituted by a pair of reflecting facets, inclined at an acute angle to each other, created by the provision of wells in the integrated waveguide optics structure, and defining between them an aperture through which all light coupled between the first and second diffraction gratings is coupled.

5. An optical comb filter having a set of pass-band teeth regularly spaced in optical frequency, which teeth are separated by intervening stop-bands, which comb filter has an optical input/output port optically coupled with itself via an optical waveguide diffraction grating and a retro-reflector that causes light incident upon the retro-reflector from the input/output port via the grating to make a return passage through the grating back to the input/output port;

wherein the grating provides multiple optical waveguide paths from said input/output port to said retro-reflector via different grating elements of the gratings;

wherein the difference in optical path length occasioned by paths via each pair of adjacent grating elements of the grating has substantially the same value, said difference value defining the Free Spectral Range of the grating, being the frequency range over which said optical path length difference produces a phase difference whose value ranges over $2\pi$; and wherein the retro-reflector couples spatial information back into the grating in addition to intensity information, and includes a field stop that limits the frequency range of the coupling, and hence the passband of each tooth of the comb filter to a value less than the Free Spectral Range of the diffraction grating.

6. A comb filter as claimed in claim 5, wherein the field stop limits the frequency range of the coupling to a value less than one half of the Free Spectral Range of the diffraction grating.

7. A comb filter as claimed in claim 6, wherein the diffraction grating, and the optical coupling that extends between it and the retro-reflector, are constructed in integrated waveguide optics structure format with the diffraction grating configured as a set of optical waveguides extending in side-by-side relationship in a set of arcuate paths.

8. A comb filter as claimed in claim 7, wherein the field stop is provided by two wells formed in the integrated waveguide optics structure, each well having a side wall that defines an aperture between said side walls, and wherein each side wall is inclined at an angle to the diffraction grating such that light incident upon the side wall from the diffraction grating is reflected by that side wall into directions that do not couple the light back into the diffraction grating.

9. A comb filter as claimed in claim 7, wherein the retroreflector wincludes a quarter-waveplate oriented such that light that is incident upon the retroreflector plane polarised in the plane that contains said arcuate paths is reflected plane polarised orthogonally with respect to that plane.

* * * * *